United States Patent Office 3,701,733
Patented Oct. 31, 1972

3,701,733
FUNCTIONAL FLUID COMPOSITIONS
Terrill D. Smith, Edmond, Okla., assignor to Monsanto Company, St. Louis, Mo.
No Drawing. Continuation-in-part of application Ser. No. 715,175, Mar. 22, 1968, now Patent No. 3,597,359. This application Mar. 26, 1971, Ser. No. 128,576
Int. Cl. C09k 3/00
U.S. Cl. 252—78
16 Claims

ABSTRACT OF THE DISCLOSURE

Compositions comprising amides of an acid of phosphorus and a small amount of a perfluorinated alkylene ether-containing compound having a degree of polymerization from 1 to 50 exhibit the ability to inhibit and control damage to mechanical members in contact with said compositions. The compositions have many uses, among which are their use as hydraulic fluids.

CROSS REFERENCE TO RELATED APPLICATIONS

This application is a continuation-in-part of application Ser. No. 715,175 filed Mar. 22, 1968 and now Pat. No. 3,597,359.

BACKGROUND OF THE INVENTION

Field of the invention

This invention relates to functional fluid compositions having an ability to inhibit and control damage to mechanical members in contact with said fluid compositions, to functional fluid compositions which exhibit an improved tendency to resist fluid degradation and more particularly to compositions comprising certain functional fluids based upon amides of an acid of phosphorus and an additive amount, sufficient to inhibit and control damage, of certain perfluorinated alkylene ether-containing compounds.

Description of prior art

Functional fluids have been used as electronic coolants, diffusion pump fluids, lubricants, damping fluids, bases for greases, power transmission and hydraulic fluids, heat transfer fluids, heat pump fluids, refrigeration equipment fluids and as filter mediums for air conditioning systems. In many of these uses there have been reports of damage to the fluid during use and to mechanical members, especially metallic members, in contact with the fluid as evidenced by a loss of weight of such members. Thus, damage has been reported in aircraft hydraulic systems, jet turbine control systems, and steam turbine control systems. Damage has also been observed on such materials as glass, Teflon, Mylar, Plexiglas and other members constructed from materials other than metals.

One particularly undesirable condition which may exist during the use of a functional fluid and which can cause damage is fluid cavitation, which can be described as a phenomenon which results in the formation and subsequent violent collapse of vapor-filled bubbles in a fluid subjected to requisite pressure changes. Bubbles can be formed when the fluid pressure is at or below its bubble point pressure and when fluid temperature peaks above fluid bubble point temperature; above the bubble point pressure, the bubbles collapse. Pressure changes sufficient to cause cavitation can occur in several ways; for example, a fluid flowing through a restriction, such as a partially closed valve, can encounter at the point of highest velocity a pressure far lower than both the bubble point and the valve outlet pressures thus resulting in bubble formation. As these bubbles reach a point of high pressure, for example on the discharge side of the valve, a violent collapse of the bubbles occurs thereby producing shock waves which can be severe enough to damage the fluid and mechanical members in contact with the fluid. As another example, cavitation conditions can occur when a surface is moved through or vibrated in a relatively stagnant liquid.

While there are many undesirable results caused by cavitation damage, one important aspect of the problem is the effect on hydraulic systems and fluids experiencing such damage. For example, the structural mechanical parts in a hydraulic system such as pumps and valves exhibit a marked decrease in strength and the geometry of the parts is altered. Such changes in the case of valves can cause faulty operations, excessive leakage or even hazardous conditions. As a result, damage necessitates premature overhaul of mechanical parts which is both costly and time consuming. In addition, as damage occurs the metal from metallic mechanical parts in contact with the functional fluid contaminates the fluids and requires premature draining of the fluids from the system, and excessive filter replacement, and can also cause a change in physical and chemical properties of the fluids. Metal contaminants can reduce the oxidative stability of a fluid thereby adversely affecting fluid performance. In addition to any effects resulting from contamination by metal (or other) contaminant, such damage to the fluid can manifest itself in numerous ways, among which are (a) viscosity change, (b) increase in acid number, (c) formation of insoluble materials, (d) increased chemical reactivity and (e) discoloration.

It is, therefore, an object of this invention to provide functional fluid compositions having an ability to inhibit and control damage. It is a further object of this invention to provide a process for controlling cavitation damage in a hydraulic system.

Further objects will be apparent from the following description of the invention.

SUMMARY

It has now been found that damage, herein defined to include damage to a functional fluid and to mechanical members in contact with said fluid, can be effectively controlled and inhibited in hydraulic systems employing a functional fluid based upon an amide of an acid of phosphorus by incorporating into the functional fluid a damage inhibiting amount of perfluoro alkylene ether-containing compound represented by the formula

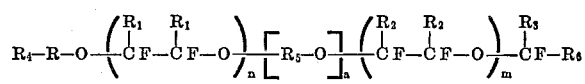

wherein R is perfluoroalkylene, $R_1$ and $R_2$ are each selected from the group consisting of fluorine and trifluoromethyl provided that not more than one $R_1$ is trifluoromethyl and provided that not more than one $R_2$ is trifluoromethyl, $R_3$ is selected from the group consisting of fluorine and trifluoromethyl, $R_4$ is fluorine, $R_5$ is perfluoroalkylene having at least 2 carbon atoms, $R_6$ is selected from the group consisting of hydrogen, trifluoromethyl and perfluoroethyl, $a$ is 0 or 1, $n$ and $m$ are each whole numbers having a value of from 0 to 50 and the sum of $n+m$ is from 1 to 50.

DESCRIPTION OF PREFERRED EMBODIMENTS

It is an important part of this invention that the incorporation of a perfluoro alkylene ether-containing compound in functional fluids produces a functional fluid composition having the ability to inhibit damage without completely affecting adversely other essential properties of such fluids such as viscosity, oxidative and thermal stability, corrosion resistance in the presence of metal parts and lubricating qualities of the functional fluid.

The concentration of a perfluoro alkylene ether-containing compound in a functional fluid is adjusted in terms of the particular system and the functional fluid which is utilized in this system to provide functional fluid compositions of this invention which contain an additive amount of a perfluoro alkylene ether-containing compound sufficient to inhibit and control damage. In addition the particular perfluoro alkylene ether-containing compound can be adjusted with respect to the number of perfluoro alkylene ether-containing units as well as the weight percent of the perfluoro alkylene ether unit in the compound in order to obtain the maximum amount of inhibition of damage based on the use of a minimum concentration of the perfluoro alkylene ether-containing compound.

For the functional fluid compositions of this invention, the concentration of a perfluoro alkylene ether-containing compound in the composition can vary from about 0.005 weight percent to about 15 weight percent. The preferred concentration range of a perfluoro alkylene ether-containing compound is from about 0.01 weight percent to about 10 weight percent and even more preferably from about 0.025 weight percent to about 5 weight percent.

The compositions of this invention are prepared by incorporating a damage inhibiting amount of a perfluoro alkylene ether-containing compound into the functional fluid. Thus, the process for preparing a functional fluid having the ability to inhibit and control damage to mechanical members in contact with the functional fluid is accomplished by adding a perfluoro alkylene ether-containing compound to a functional fluid to obtain a concentration of a perfluoroalkylene ether-containing compound in the functional fluid of from about 0.005 weight percent to about 15 weight percent.

The perfluoro alkylene ether-containing compounds which are preferred can be defined by (1) the number of perfluoro alkylene ether units in the perfluoro alkylene ether-containing compound, (2) the weight percent of these units in the perfluoro alkylene ether-containing compound and (3) the relative proportion of the number of perfluoro alkylene ether units containing 3 carbon atoms to the number of perfluoro alkylene ether units containing 2 carbon atoms in the perfluoro alkylene ether-containing compound.

With respect to the preferred number of repeating perfluoro alkylene ether units, such number can be defined by the sum of $n+m$ in the above formula for the perfluoro alkylene ether-containing compound and in general it is preferred that the sum of $n+m$ be from 1 to about 25 and more preferably from 1 to about 10. With respect to the preferred weight percent of the perfluoro alkylene ether units in the perfluoro alkylene ether-containing compound, it is preferred that such weight percent be at least 60% more preferably at least 75% and still more preferably at least 90%. With respect to the relative proportion of the perfluoro alkylene ether units containing 3 carbon atoms to those containing 2 carbon atoms, it is preferred that such relative proportion be at least 1:1, more preferably 1.5:1 and still more preferably 2:1.

The perfluoro alkylene ether-containing compounds which are particularly preferred and which are within the preferred limits as set forth above are perfluoro alkylene ether-containing compounds wherein R is a perfluoro alkylene having from 1 to 5 carbon atoms, and $R_5$ is perfluoro alkylene having from 2 to 10 carbon atoms.

Typical examples of perfluoro alkylene radicals are alkylene radicals which are completely substituted with fluorine. Typical examples of alkylene radicals are methylene ethylene, propylene, tetramethylene, pentamethylene, octamethylene, decamethylene, dodecamethylene, 4-methyl pentamethylene, 2-ethyl pentamethylene, and 5-propyl octamethylene.

Typical examples of perfluoro alkylene ether-containing compounds which are incorporated into a base stock to prepare the functional fluid compositions of this invention are

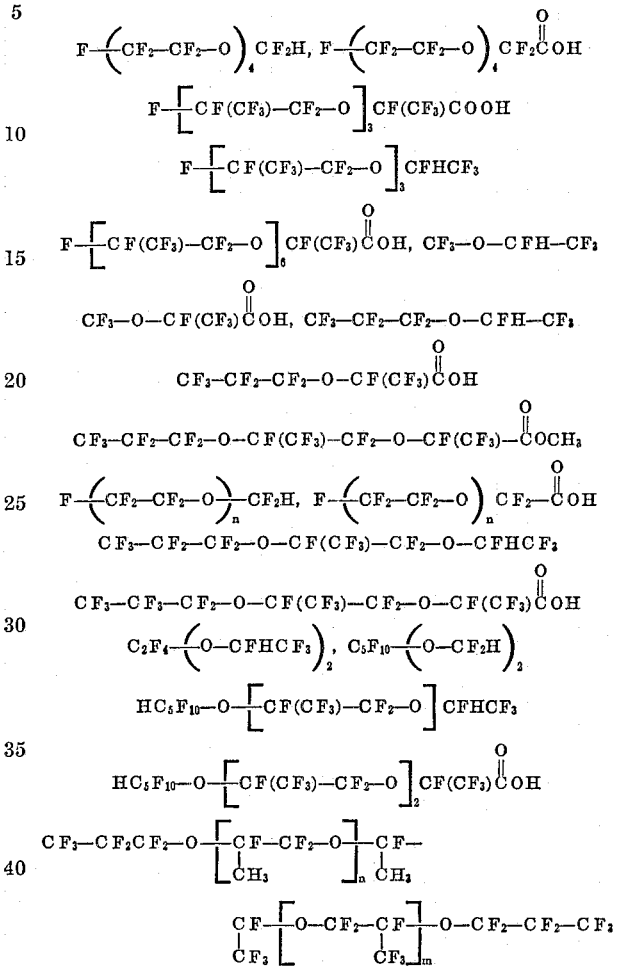

where $m$ and $n$ vary from 2 to 20, 2,3-bis(heptafluoropropoxy)octafluorobutane,

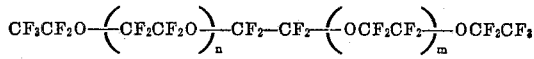

where $m$ and $n$ vary from 1 to 10

$$CF_3CF_2O(CF_2CF_2O)_nCF_2CF_2OH$$

where $n$ is 1 to about 50, $$CF_3CF_2CF_2O[CF(CF_3)CF_2O]_nCF(CF_3)CH_2OH$$

where $n$ is 1 to about 50,

$$CF_3CF_2O(CF_2CF_2O)_2CF_2CH_2OH, CF_3CF_2O(CF_2CF_2O)_3CF_2CH_2OH$$

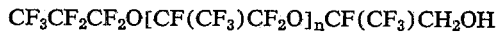

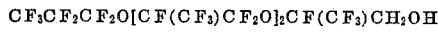
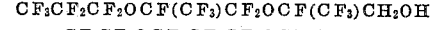

$$CF_3-CF_2-O-CF_2-CF_2-O-CF_2-COOH$$

diethyl ether of tetrafluoroethylene glycol, dimethyl ether of octafluorodiethylene glycol, dimethyl ether of polyperfluoro propylene glycol containing 5 repeating units, diethyl ether of perfluoro propylene glycol containing 7 repeating units and a mixture of dimethyl ether perfluoro propylene glycol containing from 5 to 9 repeating units.

The functional fluids to which a perfluoroalkylene ether-containing compound is added to provide the functional fluid compositions of this invention include functional fluids comprising a major amount of a base stock which is an amide of an acid of phosphorus, or a blend of esters of an acid of phosphorus and/or aromatic ether compounds and/or esters of polyhydric compounds and/or an amide of an acid of phosphorus with halogenated blending agents, representative of which are halodiphenyl ethers, halobenzenes, halonaphthalenes, haloalkylated benzenes, perhalodienes and perhalocyclicdienes.

Whereas the above base stock can be utilized to prepare functional fluid compositions of this invention when utilized in major amounts, it is preferred to use such base stock at a concentration of at least about 60 weight percent and even more preferably at concentrations of 65, 75, 85 and 95 weight percent.

The following base stocks are only illustrative of typical base stocks that can be utilized in preparing the functional fluid compositions of this invention and the instant invention can be practiced utilizing various modifications of the base stocks which are set forth below.

Typical examples of the amides of an acid of phosphorus which are suitable as base stocks for preparing the functional fluid compositions of this invention are those represented by the structure

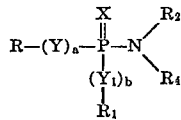

wherein Y is oxygen, sulfur or

and $Y_1$ is oxygen, sulfur or

R, $R_1$, $R_2$, $R_3$, $R_4$ and $R_5$ are each independently selected from the group consisting of alkyl, alkoxyalkyl, aralkyl, aroxyalkyl, aroxyaryl, alkoxyaryl and the members of the above group further substituted with halogen and/or alkyl, X is selected from the group consisting of sulfur and oxygen and $a$ and $b$ are whole numbers having a value of 0 to 1 and the sum of $a+b$ is from 1 to 2. These compounds within the generic formula can be prepared by the prior art methods for preparing amides of phosphorus.

Typical examples of alkyl radicals are as follows: methyl, ethyl, n-propyl, isopropyl, n-butyl, isobutyl, sec-butyl, tert-butyl, n-amyl, isoamyl, 2-methylbutyl, 2,2-dimethyl propyl, 1-methyl butyl, diethyl methyl, 1,2-dimethyl propyl, tert-amyl, n-hexyl, 1-methylamyl, 1-ethyl butyl, 1,2,2-trimethyl propyl, 3,3-dimethyl butyl, 1,1,2-trimethyl propyl, 2-methyl amyl, 1,1-dimethyl butyl, 1-ethyl 2-methyl propyl, 1,3-dimethyl butyl, isohexyl, 3-methylamyl, 1,2-dimethyl butyl, 1-methyl 1-ethyl propyl, 2-ethyl butyl, n-heptyl, 1,1,2,3-tetramethyl propyl, 1,2-dimethyl 1-ethyl propyl, 1,1,2-trimethyl butyl, 1-isopropyl 2-methyl propyl, 1-methyl 2-ethyl butyl, 1,1-diethyl propyl, 2-methyl hexyl, 1,1-dimethyl amyl, 1-isopropyl butyl, 1-ethyl 3-methyl butyl, 1,4-dimethyl amyl, iso-heptyl, 1-methyl 1-ethyl butyl, 1-ethyl 2-methyl butyl, 1-methyl hexyl, 1-propyl butyl, n-octyl, 1-methyl heptyl, 1,1-diethyl 2-methyl propyl, 1,1,3,3-tetramethyl butyl, 1,1-diethyl butyl, 1,1-dimethyl hexyl, 1-methyl 1-ethyl amyl, 1-methyl 1-propyl butyl, 2-ethyl hexyl, 6-methyl heptyl (iso-octyl), n-nonyl, 1-methyl octyl, 1-ethyl heptyl, 1,1-dimethyl heptyl, 1-ethyl 1-propyl butyl, 1,1-diethyl 3-methyl butyl, diisobutyl methyl, 3,5,5-trimethyl hexyl, 3,5-dimethyl heptyl, n-decyl, 1-propyl heptyl, 1,1-diethyl hexyl, 1,1-dipropyl butyl, 2-isopropyl 5-methyl hexyl, decyl radicals, e.g. n-decyl, dodecyl radicals, e.g. lauryl, tetradecyl radicals, e.g. myristyl, hexadecyl radicals, e.g. cetyl; and octadecyl. Typical examples of aralkyl radicals, aryl for the purpose of any aryl-containing radical is herein defined to include mono-, di- and polynuclear hydrocarbons, such as phenyl, naphthyl and anthryl, e.g. aryl and alkylaryl-substituted alkyl radicals, are benzyl methylbenzyl, caprylbenzyl, diisobutyl benzyl, phenylethyl, phenylpropyl, phenyloctadecyl; xenyl- and alkylxenyl-substituted alkyl radicals, e.g. xenylmethyl, caprylxenylmethyl, xenylethyl, diisobutylxenylmethyl; naphthyl- and alkylnaphthyl-substituted alkyl radicals, e.g. naphthylmethyl, tert-amylnaphthylmethyl, naphthylethyl and octylnaphthylethyl. Typical examples of oxygen-containing alkyl radicals, e.g. alkoxy-substituted alkyl radicals, are propoxyethyl radicals, e.g. n-propoxyethyl, isopropoxyethyl; butoxyethyl radicals, e.g. n-butoxyethyl, isobutoxyethyl, tert-butoxyethyl; octoxyethyl radicals, e.g. n-octoxyethyl, diisobutoxyethyl; dibutoxypropyl radicals, e.g. 2,3-di-n-butoxypropyl, 3,3-diisobutoxypropyl; dioctoxypropyl and 2,3-bis(diisobutoxy)propyl. Typical examples of aroxy-substituted alkyl radicals are, for example, phenoxy- and alkylphenoxy-substituted alkyl radicals, e.g. phenoxymethyl, phenoxyethyl, cetylphenoxyethyl, and capyrylphenoxyethyl. Typical examples of aryl, alkoxyaryl, aroxyaryl and halo and alkyl derivatives thereof are phenyl, cresyl, xylyl, mesityl, ethylphenyl, diethylphenyl, isopropylphenyl, n-propylphenyl, tert-butylphenyl, di-tert-butylphenyl, isobutylphenyl, n-butylphenyl, tert-amylphenyl, cyclohexylphenyl, methylcyclohexylphenyl, caprylphenyl, diisobutylphenyl, laurylphenyl, cetylphenyl, paraffin wax-substituted phenyl, monochlorophenyl, polychlorophenyl, e.g. dichlorophenyl, trichlorophenyl, lauroxyphenyl, xenyl, mono- and polychloroxenyl, caprylxenyl, phenoxyphenyl, thiophenoxyphenyl, diisobutylphenoxyphenyl, naphthyl, mono- and polychloronaphthyl, cetylnaphthyl, methylmonochlorphenyl radicals, methylpolychlorophenyl radicals, e.g. methyldichlorophenyl radicals and methyltrichlorophenyl radicals.

It is contemplated within the scope of this invention that the aforedescribed radicals such as alkyl, aralkyl, alkoxyalkyl aroxyalkyl, aryl, aroxyaryl, alkoxyaryl and alkaryl can have all or part of the hydrogen replaced with halogen, such as fluorine, chlorine or bromine.

The preferred amides of an acid of phosphorus are those compounds wherein $a$ and $b$ have a value of 1, Y and $Y_1$ are selected from oxygen and

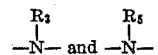

These base stocks are referred to generically as amides of phosphorus and include phosphoroamidates, phosphorodiamidates and phosphorotriamidates. The preferred class of mono-, di- and triphosphoroamidates are the diaryl- and/or substituted-aryl-N,N-dialkylphosphoroamidates, aryl- and/or substituted-aryl-N,N-dialkyl-N,N'-dialkylphosphorodiamidates and the N,N-dialkyl-N',N'-dialkyl-N'',N''-dialkylphosphorotriamidates. Particularly preferred are the phosphorus dialkyl amides whereas the alkyl groups attached to nitrogen are different i.e. one is a linear alkyl group and the other is an isomeric alkyl group i.e. secondary or tertiary alkyl or one with a different number of carbon atoms. The substituents attached to the aryl radical include by way of example halogen, alkyl, haloalkyl and aroxy. The preferred substituents on the aryl group are halogen, alkyl and haloalkyl and with respect to the halogen atom, it is preferred that such halogen atom be chloro or bromo and occupy the meta position. In addition, the mono-, di- and triphosphoroamidates can be defined by the number of carbon atoms present in the alkyl group, the aryl group and the substituted aryl group, respectively, and with respect to the alkyl group, it is preferred to have from about 1 to about 18 carbon atoms, more preferably from about 1 to about 8 carbon atoms and with respect to the number of carbon atoms present in the aryl and substituted-aryl group, it is preferred to have from 6 to about 16 carbon atoms, more preferably from 6 to about 12 carbon atoms. Examples of the mono-, di- and triphosphoroamidates are those compounds represented by the generic formula as set forth above utilizing alkyl, alkaryl, haloaryl, halo-alkaryl and aroxyaryl radicals as illustrated above. Typical examples of the amides of an acid of phosphorus, that is, mono-, di- and triamides of an acid of phosphorus, are phenyl - methyl - N,N - dimethylphosphoroamidate, phenyl-methyl-N-n-butylphosphoroamidate, mixtures of phenyl-m-cresyl-N-methyl-N-butylphosphoroamidate and phenyl-p-cresyl - N,N - dimethylphosphoroamidate, mixtures of m-cresyl-p-cresyl-N-methyl-N-propylphosphoroamidate,
di-m-cresyl-N,N-dimethylphosphoroamidate,
di-p-cresyl-N,N-dimethylphosphoroamidate,
di-m-bromophenyl-N-methyl-N-n-butylphosphoroamidate,
di-m-chlorophenyl-N-methyl-N-n-butylphosphoroamidate,
di-alpha,alpha,alpha-trifluoro-m-cresyl-N-methyl-N-n-butylphosphoroamidate,
di-p-bromophenyl-N-methyl-N-n-isoamylphosphoroamidate,
di-p-chlorophenyl-N-methyl-N-n-isoamylphosphoroamidate,
p-chlorophenyl-m-bromophenyl-N-methyl-N-n-isoamylphosphoroamidate,
phenyl-N-methyl-N-butyl-N'-methyl-N'-butylphosphorodiamidate,
phenyl-N,N-di-n-butyl-N',N'-di-n-butylphosphorodiamidate,
phenyl-N,N-dimethyl-N',N'-dimethylphosphorodiamidate,
m-chlorophenyl-N-methyl-N-n-butyl-N'-methyl-N'-n-butylphosphorodiamidate,
m-bromophenyl-N-methyl-N-n-butyl-N'-methyl-N'-n-butyl-N'-methyl-N'-n-butylphosphorodiamidate,
p-chlorophenyl-N-methyl-N-isobutyl-N'-methyl-N'-isoamylphosphorodiamidate,
p-bromophenyl-N-methyl-N-isobutyl-N'-methyl-N'-isoamylphosphorodiamidate,
N-methyl-N-butyl-N'-methyl-N'-butyl-N''-methyl-N''-butylphosphorotriamidate,
N-methyl-N-butyl-N',N''-tetramethylphosphorotriamidate,
N-di-n-propyl-N',N''-tetramethylphosphorotriamidate, and
N,N'-di-n-propyl-N''-dimethylphosphorotriamidate.

The invention can be better appreciated by the following non-limiting examples.

EXAMPLE 1

A nickel specimen was immersed in about 800 cc. of phenyl N-butyl-N-methyl-N'-butyl-N'-methyl phosphoroamidate

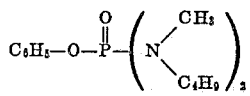

containing 5.0 weight percent CF₃CF₂CF₂—O—CFHCF₃ and a 20 kilocycle vibration induced into the specimen. The temperature of the fluid was 85° C. and the test duration was 45 minutes. At the conclusion of the test the weight loss of the specimen was determined and it was found that the relative weight loss was 37 percent. Relative weight loss is defined to mean the total weight loss of the metal specimen when tested in a fluid containing the additive present divided by the weight loss of the metal specimen when the neat fluid is tested without any additive present, times 100.

An improvement in the weight loss of the nickel test specimen is also obtained by substituting N-methyl-N-butyl-N'-methyl-N'-butyl-N''-methyl-N''-butylphosphorotriamidate,
N-methyl-N-butyl-N',N''-tetramethylphosphorotriamidate,
N-di-n-propyl-N',N''-tetramethylphosphorotriamidate,
N,N'-di-n-propyl-N''-dimethylphosphorotriamidate,
p-bromophenyl-N-methyl-N-isobutyl-N'-methyl-N'-isoamylphosphorodiamidate,
phenyl-methyl-N,N-dimethylphosphoroamidate, or
di-alpha,alpha,alpha-trifluoro-m-cresyl-N-methyl-N-n-butylphosphoroamidate for the amidate in Example 1 while maintaining the additive in the same concentration range.

An improvement in the weight loss of the nickel test specimen is also obtained by substituting

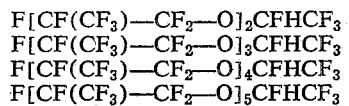

or other perfluorinated alkylene ether-containing compounds as hereinbefore defined for the additive in Example 1.

The test method as employed to determine relative damage has been found to correlate quite well with actual test runs on simulated hydraulic system test stands, such as the Fairey Test Stand, and has correlated quite well with the hydraulic system of commercial aircraft where damage levels have been determined. The test results demonstrate that functional fluid compositions of this invention having incorporated therein a perfluoro alkylene ether-containing compound control and inhibit damage to mechanical members in contact with said functional fluid.

It is believed that the cause of cavitation damage in aircraft hydraulic systems is by a pressure excursion process whereby the fluid pressure dips below fluid bubble point pressure. In the case where the fluid pressure dips below the fluid bubble point pressure, damage on the return side of the cycle, that is, the side where a high pressure is again encountered, is observed. The pressure excursion process for aircraft hydraulic systems appears to be initiated by simple acceleration of flow through a restricted passage from high to low pressure. Damage has been observed in the valve porting areas on servo valves, electrical depressurizing valves in pumps, pressure regulating valves, poppet relief valves, solenoid valves, check valves (ball or poppet) and in general wherever a large pressure drop exists across a short seating region, that is, for example, the seating region where a valve seats in the pump. The cavitation damaged area that is seen in valve porting areas on microscopic analysis has the following appearance: jagged, cinder-like, irregular, rough, undermined, peak-valley and cavities. The damage observed by microscopic analysis does not exhibit coloration or pitting such as would be found by corrosion, gouges, scratches such as would be exhibited by machining, fatigue spalling such as would be observed by the sudden removal by large particles, particle erosion which would be exhibited by smooth and rounded edges or by wear wherein microscoring and metal transfer is observed. Thus, damage in a hydraulic system and in particular aircraft hydraulic systems which is subject to cavitation damage can be determined by comparing under microscopic examination damaged areas of valves with similar valves which are subject to the phenomenon of wear, fatigue spalling, corrosion, machining and particle erosion. In addition, valves undergoing damage by the process of cavitation can be compared with known specimen which have been subjected to induced cavitation damage. An example of this type of a comparison is a comparison of damaged metal tips in the vibrating probe with damaged valves from a hydraulic system. A comparison of this type can demonstrate damage in a hydraulic system since the vibrating probe gives a characteristic damage spectrum which is exhibited by valves in a hydraulic system.

Apparatus have been invented which determine the leakage rate through valves in hydraulic systems and in particular aircraft hydraulic systems. These apparatus are referred to as leak detectors and can continually monitor leakage rates in aircraft hydraulic systems over a period of time. Thus, aircraft hydraulic systems which are subject to cavitation damage will exhibit increased leakage rates over a period of time as the geometry of the valve is altered through cavitation damage. It has been found that aircraft hydraulic systems employing functional fluid compositions of this invention, when compared to aircraft hydraulic systems not using functional fluid compositions of this invention, exhibit reduced leakage rates as a function of time based upon the above comparison. A type of leak detector for monitoring leakage rates is disclosed in application Ser. No. 630,667 and now abandoned.

Utilizing the above methods, a determination of whether or not an aircraft hydraulic system is subject to cavitation damage can be made, and the reduction in cavitation damage obtained by utilizing functional fluid compositions of this invention can be determined. It has been found that a tremendous reduction in cavitation damage to members of the hydraulic fluid system is observed when functional fluid compositions of this invention are compared to functional fluid compositions not having incorporated therein additive amounts of a perfluoro alkylene ether-containing compound. Therefore as a result of the excellent control of damage utilizing the compositions of this invention, hydraulic systems and in particular aircraft hydraulic systems can have cavitation damage inhibited and controlled continually from the time of introduction of the functional fluid compositions of this invention into a hydraulic system. Thus, included within this invention is a process for continually controlling cavitation damage in a hydraulic system which is subject to cavitation damage which comprises introducing and employing in the hydraulic system a hydraulic fluid comprising a major amount of a base stock selected from those described above having incorporated therein a damage inhibiting amount of a perfluoro alkylene ether-containing compound.

As a result of the excellent inhibition and control damage utilizing the functional fluid compositions within the scope of this invention, improved hydraulic pressure devices can be prepared in accordance with this invention which comprise in combination a fluid chamber and an actuating fluid composition in said chamber, said fluid comprising a major amount of one or more of the base stocks hereinbefore described and a damage inhibiting amount of a perfluoro alkylene ether-containing compound. In such a system, the parts which are so lubricated include the frictional surfaces of the source of power, namely the pump, valves, operating pistons and cylinder, fluid motors, and in some cases, for machine tools, the ways, tables and slides. The hydraulic system may be of either the constant-volume or the variable-volume type of system.

The pumps may be of various types, including centrifugal pumps, jet pumps, turbine vane, liquid piston gas compressors, piston-type pump, more particularly the variable-stroke piston pump, the variable-discharge or variable displacement piston pump, radical-piston pump, axial-piston pump, in which a pivoted cylinder block is adjusted at various angles with the piston assembly, for example, the Vickers Axial-Piston Pump, or in which the mechanism which drives the pistons is set at an angle adjustable with the cylinder block; gear-type pump, which may be spur, helical or herringbone gears, variations of internal gears, or a screw pump; or vane pumps. The valves may be stop valves, reversing valves, pilot valves, throttling valves, sequence valves, relief valves, servo valves, non-return valves, poppet valves or unloading valves. Fluid motors are usually constant or variable-discharge piston pumps caused to rotate by the pressure of the hydraulic fluid of the system with the power supplied by the pump power source. Such a hydraulic motor may be used in connection with a variable-discharge pump to form a variable-speed transmission. It is, therefore, especially important that the frictional parts of the fluid system which are lubricated by the functional fluid be protected from damage which can result in seizure of frictional parts, excessive wear and premature replacement of parts.

The fluid compositions of this invention when utilized as a functional fluid can also contain dyes, pour point depressants, metal deactivator, acid scavengers, antioxidants, defoamers, in concentration sufficient to impart antifoam properties, such as from about 10 to about 100 parts per million, viscosity index improvers such as polyalkylacrylates, polyalkylmethacrylates, polycyclic polymers, polyurethanes, polyalkylene oxides and polyesters, lubricity agents and the like.

The preferred polymeric viscosity index improvers which may be employed in the compositions of this invention are the polymers of alkyl esters of alpha-beta unsaturated monocarboxylic acids having the formula

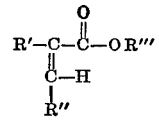

wherein R' and R'' are each individually hydrogen or a $C_1$ to $C_{10}$ alkyl group, and R''' is a $C_1$ to $C_{12}$ alkyl group. Illustration of the alkyl groups represented by R', R'' and R''' within their definitions as given above are for example methyl, ethyl, propyl, butyl, t-butyl, isopropyl, 2-ethylhexyl, hexyl, decyl, undecyl, dodecyl and the like. These polymers include, for example, poly(butylmethacrylates), poly(hexylmethacrylates), poly(octylacrylates), poly(dodecylacrylates) and polymers wherein the ester is a mixture of compounds obtained by esterifying the $\alpha$-$\beta$ unsaturated monocarboxylic acid with a mixture of monoalcohols containing from 1 to 12 carbon atoms.

The polyalkylmethacrylates and acrylates suitable for the purpose of this invention are in general those resulting from the polymerization of alkylmethacrylates or alkylacrylates in which the alkyl groups have from 4 to 12 carbon atoms. The alkyl groups may be mixtures such as derived from a mixture of alcohols in which case there may be included some alkyl groups having as low as 2 carbon atoms and as high as about 18 carbon atoms. The number of carbon atoms in the alkyl groups should preferably be such that the polymer is compatible with the particular fluid used. Usually it will be satisfactory for the alkyl group of the methacrylate polymer to be from about 4 to 10 carbon atoms. The alkyl group may be branched chain or isoalkyl, but it is preferably normal alkyl. The molecular weight of the polymerized alkylmethacrylate can be from 5,000 to about 40,000. The total amount of viscosity index improver employed in the compositions of the instant invention can range from about 2 to about 20 parts per 100 parts of the total composition.

It is also contemplated within the scope of this invention that the base stocks as aforedescribed can be utilized singly or as a fluid composition containing other base stocks in varying proportions. Such other base stocks are, for example, the esters of phosphorus acid e.g. phosphates, phosphonates, phosphinates, etc., orthosilicates, organopolysiloxanes, polyesters, liquid polyphenyl ethers and thioethers, chlorinated biphenyls and the like. Typical examples of these phosphate esters are for example, dibutylphenyl phosphate, triphenyl phosphate, tricresyl phosphate, tributyl phosphate, tri-2-ethylhexyl phosphate, trioctyl phosphate, and mixtures of the above phosphates such as mixture of tributyl phosphate and tricresyl phosphate, mixtures of isooctyl diphenyl phosphate and 2-ethylhexyl diphenyl phosphate, and mixtures of trialkyl phosphates and tricresyl phosphates and the like. The particularly preferred phosphate esters are those which remain liquid at temperatures of about 30° C.

Typical examples of orthosilicates useful as base stocks include the tetraalkyl orthosilicates such as tetra(octyl) orthosilicates, tetra(2-ethylhexyl)orthosilicates and the tetra(isooctyl)orthosilicates and those in which the isooctyl radicals are obtained from isooctyl alcohol which is derived from the oxo process, and the (trialkoxysilico) trialkyl orthosilicates, otherwise referred to as hexa-(alkoxy) disiloxanes, such as hexa(2-ethylbutoxy) disiloxane and hexa(2-ethylhexoxy) disiloxane.

Typical examples of esters and polyesters are di-(2 - ethylhexyl) azelate, di(2 - ethylhexyl) sebacate, diisooctyl sebacate, 2 - ethylhexyl 3:5:5 trimethylhexyl sebacate, diisooctyl azelate, di-(3:5:5 trimethylhexyl) sebacate, di(1 - methyl - 4 - ethyloctyl) sebacate, diisodecyl azelate, diisotridecyl azelate, di-(1 - methyl - 4 - ethyloctyl) glutarate, di(2-ethylhexyl) hexyl) azelate, di(2-ethylhexyl) adipate, di($C_{10}$oxo) adipate, bis(diethylene glycol monobutyl ether) adipate, di(isooctyl/isodecyl) adipate, diisotridecyl adipate, triethylene glycol di(2-ethylhexanoate), hexanediol 1,6-di(2-ethylhexanoate) and dipropylene glycol dipelargonate. Additional examples are mixtures of esters made from an aliphatic dibasic acid and a technical mixture of alcohols such as a mixture of alcohols obtained by the oxo process. Typical examples of polyester compounds can be prepared by the reaction of an acid compound with a polyhydroxy compound which polyhydroxy compound can be trimethylolpropane, trimethylolethane, pentaerythritol, dipentaerythritol, tripentaerythritol and tetrapentaerythritol.

Other esters which are suitable as base stocks are prepared by polymerizing a dihydroxy compound with a dicarboxylic acid and reacting the terminal hydroxy and acid radical with a mixture of a monocarboxylic acid and a monohydric alcohol. Specific examples of polymers which may be utilized as additives within the scope of this invention are polymers prepared by the polymerization of adipic acid and 1,2-propane diol in the presence of minor amount of short-chain monocarboxylic acids and a monohydric alcohol to give molecular weights of the polymers thereby produced of from about 700 to about 40,000 or higher. Typical examples of such base stocks are 2- to 7-ring ortho-, meta- and para-polyphenyl ethers and mixtures thereof, 2- to 7-ring ortho-, meta- and para-polyphenyl thioethers and mixtures thereof and mixed polyphenyl ether-thioether compounds, dihalogenated diphenyl ethers, such as 4-bromo-3'-chlorodiphenyl ethers and bisphenoxybiphenyl compounds and mixtures thereof.

The polyphenyl ethers contemplated are for example bis(m-phenoxyphenyl) ether,
m-bis(m-phenoxyphenoxy)benzene,
m-bis(p-phenoxyphenoxy)benzene,
o-bis(o-phenoxyphenoxy)benzene,
bis[m-(m-phenoxyphenoxy)phenyl] ether,
bis[p-(p-phenoxyphenoxy)phenyl] ether,
m-[(m-phenoxyphenoxy)(o-phenoxyphenoxy)] ether,
m-bis[m-(m-phenoxyphenoxy)phenoxy]benzene,
p-bis[p-(m-phenoxyphenoxy)phenoxy]benzene,
m-bis[m-(p-phenoxyphenoxy)phenoxy]benzene and mixtures thereof with other polyphenyl ethers.

Examples of polyphenyl thioethers and mixed polyphenyl ethers and thioethers are 2-phenylmercapto-4'-phenoxydiphenyl sulfide,
2-phenoxy-3'-phenylmercaptodiphenyl sulfide,
o-bis(phenylmercapto)benzene,
phenylmercaptobiphenyl,
bis(phenylmercapto)biphenyl,
m-(m-chlorophenylmercapto)-m-phenylmercaptobenzene,
phenylmercapto(phenoxy)biphenyl,
m-chlorodiphenyl sulfide,
bis(o-phenylmercaptophenyl) sulfide,
m-bis(m-phenylmercaptophenylmercapto)benzene,
1,2,3-tris(phenylmercapto)benzene,
1-phenylmercapto-2,3-bis(phenoxy)benzene, and the like.

The halogenated biphenyl functional fluid base stocks which can be employed in minor amounts in the composition of this invention are those having from 20 to 61% by weight combined chlorine. Typical examples of halogenated biphenyl compounds are those which contain chlorine or bromine or combinations thereof in amounts corresponding to mono-, di-, tri-, tetra-, penta- and hexa-halobiphenyl. Typical of such biphenyl compounds are the chlorinated biphenyls commercially available as products containing 21%, 32%, 42%, 48%, 54% and 60% by weight of combined chlorine. The expression halogenated biphenyl containing a stated percentage of combined halogen is used herein as including the directly halogenated products, halogenated products containing more than one specie of halogen in the same molecule and blends of one or more of such halogenated products whereby the halogen content is broadly within the range of about 20% to 60%, preferably within the range of about 30% to 42% by weight.

The base stocks of this invention can also contain other fluids which include in addition to the functional fluids described above fluids derived from coal products, and synthetic oils, e.g., alkylene polymers (such as polymers of propylene, butylene, etc., and the mixtures thereof), alkylene oxide-type polymers (e.g., propylene oxide polymers) and derivatives, including alkylene oxide polymers prepared by polymerizing the alkylene oxide in the presence of water or alcohols, e.g., ethyl alcohol, alkyl benzenes, (e.g., monoalkylbenzene such as dodecyl benzene, tetradecylbenzene, etc.), and dialkylbenzenes (e.g., n-nonyl-2-ethyl hexylbenzene); polyphenyls (e.g., biphenyls and terphenyls), hydrocarbon oils including mineral oils derived from petroleum sources and synthetic hydrocarbon oils, examples of which are mineral oils having a wide range of viscosities and volatilities such as naphthenic base, paraffinic base and mixed base mineral oils; synthetic hydrocarbon oils such as those derived from oligomerization of olefins such as polybutenes and oils derived from high-alphaolefins of from 8 to 20 carbon atoms by acid catalyzed dimerization and by oligomerization using trialuminum alkyls as catalysts; halogenated benzene, halogenated lower alkylbenzene and monohalogenated diphenyl ethers.

While this invention has been described with respect to various specific examples and embodiments, it is to be understood that the invention is not limited thereto and that it can be variously practiced within the scope of the following claims.

The embodiments of this invention in which an exclusive property or privilege is claimed are defined as follows:

1. A composition consisting essentially of
(A) at least 60 percent by weight of an amide of an acid of phosphorus represented by the formula

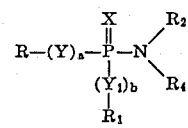

wherein Y is oxygen or

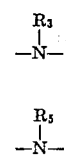

and $Y_1$ is oxygen or

R, $R_1$, $R_2$, $R_3$, $R_4$ and $R_5$ are each independently selected from the group consisting of alkyl containing from 1 to 18 carbon atoms and aryl containing 6 to 16 carbon atoms, X is selected from the group consisting of sulfur and oxygen and $a$ and $b$ are whole numbers having a value of 0 to 1, or mixtures thereof; and (B) from 0.005 to about 15 percent by weight of a perfluoroalkylene ether represented by the structure

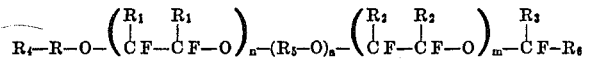

wherein R is perfluoroalkylene having from 1 to 5 carbon atoms, $R_1$ is fluorine or trifluoromethyl, provided not more than one $R_1$ is trifluoromethyl, $R_2$ is fluorine or trifluoromethyl provided that not more than one $R_2$ is trifluoromethyl, $R_3$ is fluorine or trifluoromethyl, $R_4$ is fluorine, $R_5$ is perfluoroalkylene having from 2 to 10 carbon atoms, $R_6$ is hydrogen, trifluoromethyl or perfluoroethyl, $a$ is 0 or 1, $n$ and $m$ are whole numbers from 0 to 50, and the sum of $n+m$ is from 1 to 50.

2. A composition of claim 1 wherein the perfluoroalkylene ether-containing compound is present in a damage inhibiting amount within the range of from 0.01 to about 10 weight percent.

3. A composition of claim 1 wherein the composition also contains up to 20 percent by weight of viscosity index improver which is a polyalkylacrylate, a polyalkylmethacrylate, a polyurethane, or a polyalkylene oxide.

4. A composition of claim 1 wherein the amide is phenyl - N - methyl - N - butyl - N' - methyl - N' - butylphosphorodiamidate.

5. A composition of claim 1 wherein the perfluoroalkylene ether has the formula $CF_3CF_2CF_2OCFHCF_3$.

6. A composition of claim 1 wherein the perfluoroalkylene ether has the formula $$F—(CF(CF_3)—CF_2—O)_2—CFHCF_3$$

7. A composition of claim 1 wherein the perfluoroalkylene ether has the formula $$F—(CF(CF_3)—CF_2—O)_3—CFHCF_3$$

8. A composition of claim 1 wherein the perfluoroalkylene ether has the formula

9. A composition of claim 1 wherein the perfluoroalkylene ether has the formula

10. A method for controlling cavitation damage in a hydraulic system which is subject to cavitation damage which comprises employing in said hydraulic system a composition of claim 1.

11. A method of claim 10 wherein the perfluoroalkylene ether-containing compound is $$CF_3CF_2CF_2OCFHCF_3$$

12. A method of claim 10 wherein the perfluoroalkylene ether-containing compound is

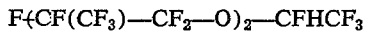

13. A method of claim 10 wherein the perfluoroalkylene ether-containing compound is

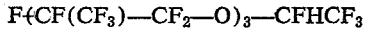

14. A method of claim 10 wherein the perfluoroalkylene ether-containing compound is

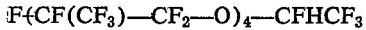

15. A method of claim 10 wherein the perfluoroalkylene ether-containing compound is

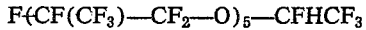

16. A method of claim 10 wherein the perfluoroalkylene ether-containing compound is present in the range of from 0.01 to about 10 weight percent.

References Cited

UNITED STATES PATENTS

| | | | |
|---|---|---|---|
| 3,513,097 | 5/1970 | Langenfeld | 252—78 |
| 2,934,501 | 4/1960 | Moreton | 252—78 |
| 3,214,478 | 10/1965 | Milian | 252—396 X |
| 3,342,875 | 9/1967 | Selman et al. | 260—615 |
| 3,445,392 | 5/1969 | Gumprecht et al. | 252—54 |
| 3,487,020 | 12/1969 | Peeler et al. | 252—78 |

OTHER REFERENCES

| | | | |
|---|---|---|---|
| 750,427 | 1/1967 | Canada | 260—614 |

LEON D. ROSDOL, Primary Examiner

H. A. PITLICK, Assistant Examiner

U.S. Cl. X.R.
252—499, 54, 396